United States Patent [19]
Furlani

[11] Patent Number: 5,570,329
[45] Date of Patent: Oct. 29, 1996

[54] SYSTEM FOR SELECTIVELY INVERTING A MAGNETIC BIAS FIELD FOR MAGNETO-OPTIC RECORDING

[75] Inventor: Edward P. Furlani, Lancaster, N.Y.

[73] Assignee: Eastman Kodak Company, Rochester, N.Y.

[21] Appl. No.: 414,705

[22] Filed: Mar. 31, 1995

[51] Int. Cl.⁶ .................................................. G11B 13/04
[52] U.S. Cl. .............................. 369/13; 369/14; 369/110; 360/114
[58] Field of Search ........................... 369/13, 14, 110, 369/59, 114, 46

[56] References Cited

U.S. PATENT DOCUMENTS

| | | | |
|---|---|---|---|
| 4,972,337 | 11/1990 | Eguchi et al. | 369/13 |
| 4,984,224 | 1/1991 | Tsuyugauchi et al. | 369/59 |
| 5,020,042 | 5/1991 | Fearnside et al. | 369/13 |
| 5,043,959 | 8/1991 | Minami et al. | 369/114 |
| 5,229,983 | 7/1993 | Kawamura et al. | 369/13 |
| 5,291,345 | 3/1994 | Umeda et al. | 360/59 |

*Primary Examiner*—David C. Nelms
*Assistant Examiner*—Vu A. Le
*Attorney, Agent, or Firm*—Peyton C. Watkins

[57] ABSTRACT

An apparatus for selectively inverting an external magnetic field in a magneto-optic recording system so that information can be selectively recorded on or erased from a magneto-optic recording element of the system moving through the field, the apparatus comprises a first and second magnet operatively connected to each other both having a north and south pole oriented along their cross-sectional dimension, and each magnet having a pole, which is of opposite polarity from the other magnet, positioned adjacent the recording element. A device, in operative association with the magnets, alternately rotates the magnets between a first and second position so that the first position is in close proximity with the recording element, which permits either the first or second magnet to induce the magnetic field through which the recording element moves, and the second position that is in a spaced apart relationship with the first position, which substantially prevents the magnetic of either the first or second magnet from engaging the recording element.

5 Claims, 1 Drawing Sheet

SYSTEM FOR SELECTIVELY INVERTING A MAGNETIC BIAS FIELD FOR MAGNETO-OPTIC RECORDING

CROSS-REFERENCE TO RELATED APPLICATIONS

The present application is related to U.S. Applications entitled "AN APPARATUS FOR SELECTIVELY INVERTING A MAGNETIC BIAS FIELD FOR MAGNETO-OPTIC RECORDING," filed Mar. 13, 1995 by Edward Furlani and J. Kelly Lee; "AN APPARATUS FOR SELECTIVELY INVERTING A MAGNETIC BIAS FIELD FOR MAGNETO-OPTIC RECORDING," filed Mar. 15, 1995 by Edward Furlani and Christopher C. Williams.

FIELD OF THE INVENTION

The invention relates generally to the field of magneto-optic recording.

BACKGROUND OF THE RELATED ART

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the reverse magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding the magnet. When the coil is energized, the field that it creates imparts a torque to the magnet forcing it to rotate.

Although the presently known and utilized apparatus and method for rotating the magnet are satisfactorily, they are not without drawbacks. First, the magnetic coupling between the magnet and the coil is inefficient and requires substantial power. Secondly, the magnetic field from the coil permeates the surrounding region and can give rise to undesired electromagnetic interference with neighboring electrical components thereby degrading their performance.

Consequently, a need exists for an improved apparatus for selectively inverting an external magnetic field in a magneto-optic recording system so that electromagnetic interference is eliminated and less power is consumed.

SUMMARY OF THE INVENTION

It is an object of the present invention to provide an apparatus for selectively inverting a magnetic bias field in a magneto-optical recording system that eliminates or reduces the above stated drawbacks.

It is an advantage of the present invention to provide an apparatus for selectively inverting an external magnetic field in a magneto-optic recording system, which apparatus is compact and efficient to produce.

It is a feature of the present invention to provide a rotating device, in operative association with two magnets, for alternately rotating the magnets between a first and second position so that the first position is in close proximity with the recording element, which permits either the first or second magnet to induce the magnetic field through which the recording element moves, and the second position that is in a spaced apart relationship with the first position, which substantially prevents the magnetic of either the first or second magnet from engaging the recording element.

With this and other objects in view, the present invention resides in an apparatus for selectively inverting an external magnetic field in a magneto-optic recording system so that information can be selectively recorded on or erased from a magneto-optic recording element of said system moving through said field, the apparatus comprising: An apparatus for selectively inverting an external magnetic field in a magneto-optic recording system so that information can be selectively recorded on or erased from a magneto-optic recording element of the system moving through the field, the apparatus comprising: (a) a first and second magnet operatively connected to each other both having a north and south pole oriented along their cross-sectional dimension, and each magnet having a pole, which is of opposite polarity from the other magnet, positioned adjacent the recording element; and (b) means, in operative association with said magnets, for alternately rotating said magnets between a first and second position so that the first position is in close proximity with the recording element, which permits either said first or second magnet to induce the magnetic field through which the recording element moves, and the second position that is in a spaced apart relationship with the first position, which substantially prevents the magnetic of either said first or second magnet from engaging the recording element.

BRIEF DESCRIPTION OF THE DRAWINGS

In the course of the following detailed description, reference will be made to the attached drawings in which.

DETAILED DESCRIPTION OF THE PREFERRED EMBODIMENTS

Figure 1:
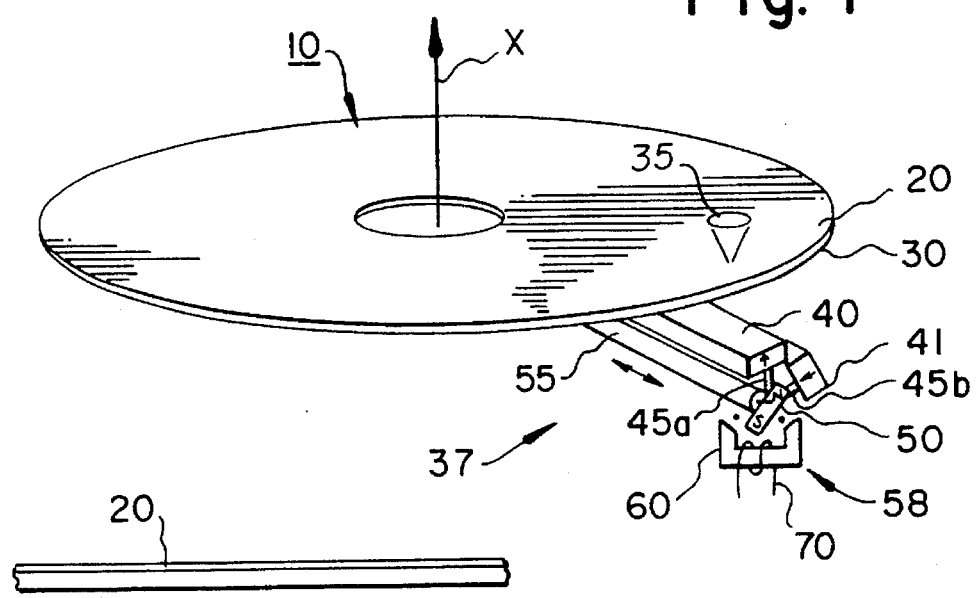
FIG. 1 is a perspective view of the present invention.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 37 includes two elongated permanent magnets 40 and 41 which are radially disposed with respect to the rotating disk 10, and which serve to produce a magnetic field that is applied to the recording element 10 for recording and erasing purposes. Two radial bars 45a and 45b are respectively attached to the magnets 40 and 41 at one of its ends and to the support member 55 at its other end for permitting attachment of the magnets 40 and 41 to the support member 55. Support member 55 is rotatable about its longitude axis as indicated by the arrows so that the magnetic field may be switched from the upward direction in which bias magnet 40 is immediately beneath the write/erase spot on recording layer 20 to a downward direction in which bias magnet 41 is immediately beneath the write/erase spot on recording layer 20. The magnet 40 will cause magnetic domains in the recording element 10 to have an upward orientation, whenever the laser beam intensity is at its high level. In this manner, the digital information provided by the laser source 35 is magnetically recorded on the recording layer 20.

To erase the previously recorded information in the recording layer 20, the direction of the magnetic bias field is inverted, as described in detail below, by positioning magnet 41 directly beneath the recording layer 20. After such field inversion, the laser source 35 scans the recording element while its intensity is maintained at its high level. While so radiated, all of the magnetic domains align themselves with the bias field thereby providing a uniformly sensitized disk or track which is again ready to record information.

For rotating support member 55, an actuator 58 is positioned adjacent to support member 55, and includes a generally arcuate shaped core 60, a coil 70 wrapped around the midsection of the core 60 for inducing a magnetic field in core 60, and a drive magnet 50 which is attached to support member 55. The operation of the actuator 58 will be described below.

Figure 2:
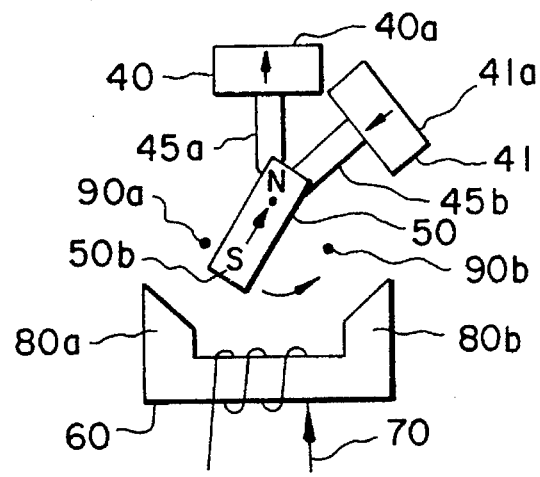
FIG. 2 is a cross sectional view of the recording element and its associated actuator of the present invention for inverting magnetic field of applied to the recording element.
Figure 3:
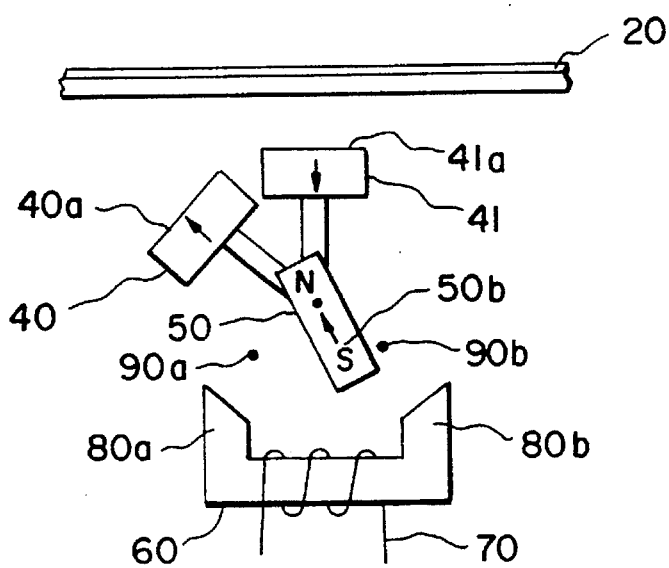
FIG. 3 is a cross sectional view of the recording element and its associated actuator of the present invention in a second orientation.

Referring to FIG. 2, when coil 70 is unenergized, drive magnet 50 rests against stop 90a with its lower pole 50b adjacent to and attracted to pole tip 80a of the actuator core 60. With this orientation, pole 40a of bias magnet 40 is directly beneath disk 10 for imparting an upward bias field (as indicated by the arrow) to recording layer 20. To invert the bias field, coil 70 is energized so that pole tip 80a of core 60 acquires the same polarity as drive magnet pole 50b thereby repelling pole 50b and causing magnet 50 to rotate in a counterclockwise direction. Pole 50b of drive magnet 50 is simultaneously attracted to pole tip 80b of actuator 60 thereby facilitating rotation. Drive magnet 50 continues to rotate until it impacts stop 90b and comes to rest as illustrated in FIG. 3. Coil 70 is energized for a period of time that is long enough to complete the rotation of drive magnet 50 to it new orientation.

Referring to FIG. 3, pole 50b of drive magnet 50 is adjacent to and attracted to pole tip 80b of actuator core 60. With this orientation, pole 41a of bias magnet 41 is directly beneath disk 10 for imparting a downward bias field (as indicated by the arrow) to recording layer 20. To again invert the bias field, coil 70 is energized so that pole tip 80b of core 60 acquires the same polarity as drive magnet pole 50b thereby repelling pole 50b causing magnet 50 to rotate in a clockwise direction. Pole 50b of drive magnet 50 is simultaneously attracted to pole tip 80a of actuator 60 thereby facilitating rotation. Drive magnet 50 continues to rotate until it impacts stop 90a and comes to rest as illustrated in FIG. 2. Coil 70 is energized for a period of time that is long enough to complete the rotation of drive magnet 50 to it new orientation.

The above described sequence is repeated each time a rotation is needed. It is instructive to note that when the coil 70 is energized, it induces a flux, and in turn the polarities generated on the pole tips 80a and 80b, through the core 60 according to the direction of the current flowing through the coil 70. For example, with the current flowing in one direction, the generated flux flows from one pole tip 80a to its other pole tip 80b and travels generally arcuately through the magnet 50 and the space immediately surrounding it so that the flux is contained within a restricted area for reducing electro-magnetic interference with other components.

It is thought that the present invention and many of its attendant advantages will be understood from the foregoing description and it will be apparent that various changes may be made in the form, construction and arrangement without departing from the spirit and scope of the invention or sacrificing all or any of its material advantages, the form herein before described being merely a preferred or exemplary embodiment.

PARTS LIST

| | |
|---|---|
| 10 | disk |
| 20 | recording layer |
| 30 | substrate |
| 35 | laser source |
| 37 | bias field device |
| 40 | bias magnet |
| 40a | magnet pole |
| 41 | bias magnet |
| 41a | magnet pole |
| 45a | radial bar |
| 45b | radial bar |
| 50 | drive magnet |
| 50b | magnet pole |
| 55 | support member |
| 58 | actuator |
| 60 | actuator core |
| 70 | coil |
| 80a | pole tip |
| 80b | pole tip |
| 90a | stop member |
| 90b | stop member |

What is claimed is:

1. An apparatus for selectively inverting an external magnetic field in a magneto-optic recording system so that information can be selectively recorded on or erased from a magneto-optic recording element of the system moving through the field, the apparatus comprising:

(a) a first and second magnet operatively connected to each other both having a north and south pole oriented along their cross-sectional dimension, and each magnet having a pole, which is of opposite polarity from the other magnet, positioned adjacent the recording element;

(b) means, in operative association with said magnets, for alternately rotating said magnets between a first and second position so that the first position is in close proximity with the recording element, which permits either said first or second magnet to induce the magnetic field through which the recording element moves, and the second position that is in a spaced apart relationship with the first position, which substantially prevents the magnetic of either said first or second magnet from engaging the recording element;

(c) a third magnet which is attached to both said first and second magnets; and (d) a core in electromagnetic communication with said third magnet for inducing said third magnet to rotate, which permits said first and second magnets to be alternately positioned between the first and second positions.

2. The apparatus as in claim 1, wherein said core includes a coil thereon which, when energized, induces a magnetic field for permitting said third magnet to rotate.

3. The apparatus as in claim 2 further comprising a first stop which engages said third magnet for preventing said third magnet from further rotation in a first predetermined direction.

4. The apparatus as in claim 1 further comprising two bars for respectively attaching said third magnet to said first and second magnets.

5. The apparatus as in claim 3 further comprising a second stop which engages said third magnet for preventing said third magnet from further rotation in a second predetermined direction.

* * * * *